United States Patent [19]

Kamimura et al.

[11] Patent Number: 5,309,493
[45] Date of Patent: May 3, 1994

[54] FUEL ROD FOR NUCLEAR REACTOR

[75] Inventors: Katsuichiro Kamimura; Norio Kawata, both of Mito, Japan; Vitanza Carlo, Atomveien, Norway

[73] Assignee: Doryokuro Kakunenryo Kaihatsu Jigyodan, Tokyo, Japan

[21] Appl. No.: 907,103

[22] Filed: Jun. 30, 1992

[30] Foreign Application Priority Data

Jul. 15, 1991 [JP] Japan .................. 3-173731

[51] Int. Cl.$^5$ .............................. G21C 3/30
[52] U.S. Cl. .................. 376/431; 376/419; 376/426
[58] Field of Search .......... 376/172, 456, 419, 423, 376/455, 426, 433, 431; 976/DIG. 41, DIG. 50

[56] References Cited

U.S. PATENT DOCUMENTS

| 3,953,286 | 4/1976 | Watson et al. ............ 376/409 |
| 4,273,616 | 6/1981 | Andrews ................... 176/68 |
| 4,393,510 | 7/1983 | Lang et al. ............... 376/172 |
| 4,493,814 | 1/1985 | Beard, Jr. et al. ......... 376/428 |
| 4,826,630 | 5/1989 | Radford et al. ........... 252/478 |
| 4,832,906 | 5/1989 | Aoyama et al. ........... 376/419 |
| 4,853,177 | 8/1989 | Pettus ...................... 376/418 |

FOREIGN PATENT DOCUMENTS 1279230  10/1968  Fed. Rep. of Germany.

Primary Examiner—Donald P. Walsh
Assistant Examiner—Meena Chelliah
Attorney, Agent, or Firm—Wenderoth, Lind & Ponack

[57] ABSTRACT

A fuel rod for nuclear reactors which contains $UO_2$ or a mixed-oxide (MOX) of $UO_2$ and $PuO_2$ as a nuclear fuel and a combustible reactivity control material e.g., $Gd_2O_3$. A plurality of hollow $UO_2$ or MOX pellets each having a hole along its central axis are spitted with a long bar of $Gd_2O_3$ to form a pellet stack, which is inserted and sealed in a cladding tube to form the fuel rod of the present invention. Since the $Gd_2O_3$ bar can be manufactured in a non-nuclear fuel manufacturing facility, it is not required to provide two separate lines, i.e., a line for handling $Gd_2O_3$ and a line for handling $UO_2$ or MOX fuel, in one manufacturing facility. The optimum design for the performance of the nuclear fuel is possible by changing the diameter and/or $Gd_2O_3$ concentration of the $Gd_2O_3$ bar depending on the desired performance of the nuclear fuel.

5 Claims, 6 Drawing Sheets

FIG. I(A)
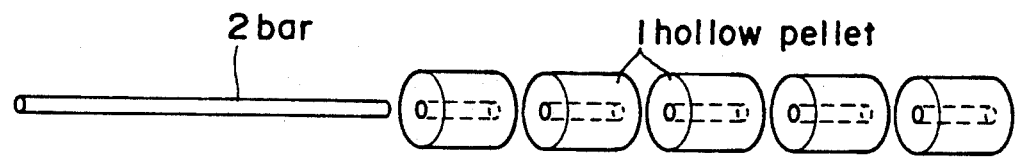
FIG.I(B)
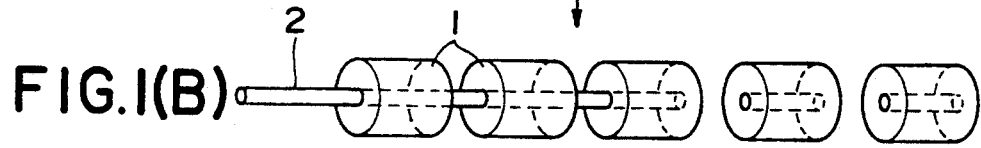
FIG.I(C)
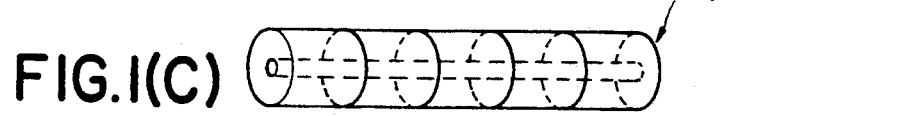
FIG.I(D)
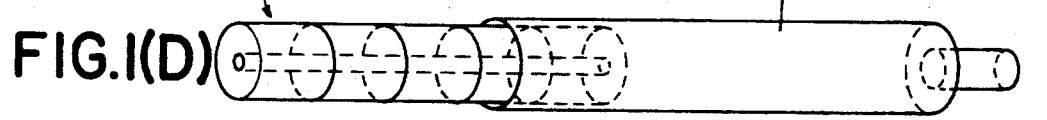
FIG.I(E)
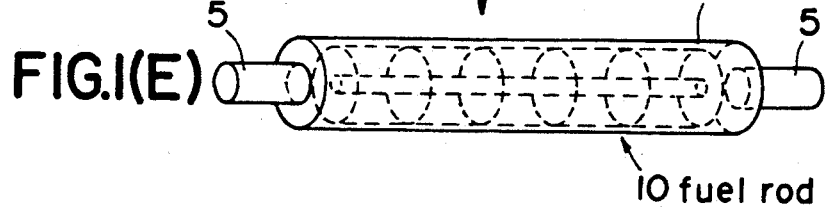

FUEL ROD FOR NUCLEAR REACTOR

BACKGROUND OF THE INVENTION

The present invention relates to a fuel rod for a nuclear reactor which contains uranium dioxide ($UO_2$) or a mixed-oxide (MOX) of uranium dioxide and plutonium dioxide as a nuclear fuel.

In a thermal neutron reactor in current use, a nuclear fuel containing gadolinium (Gd) which is a combustible reactivity control material is used in order to control the excess reactivity and to reduce the local peaking factor to thereby improve the burnup of the nuclear fuel.

Gd-containing nuclear fuels used heretofore include a homogeneous pellet consisting of a solid solution of gadolinium oxide ($Gd_2O_3$) in $UO_2$ or MOX and a double pellet consisting of a solid solution of $Gd_2O_3$ in only the central portion of the $UO_2$ or MOX pellet.

These pelletized fuels are used by piling up a number of the pellets to form a pellet stack, sealing the stack on a cladding tube to form a fuel rod, and bundling up a plurality of the fuel rods to form a fuel assembly, which is placed in a reactor core.

However, the above-described homogeneous pellets have a defect in that the power control effect of Gd is so remarkable that the fuel rods having a very low power are unevenly distributed in the assembly. Thus there are nuclear and thermal restrictions in the homogeneous pellets.

In addition, since the formation of the solid solution of $Gd_2O_3$ in $UO_2$ or MOX is limited, it is impossible to select the optimum $Gd_2O_3$ concentration depending on the performance of the nuclear fuel.

Further, in the manufacture of the homogeneous or double pellets, a manufacturing line for Gd-free pellets and one for Gd-containing pellets are necessitated in a nuclear fuel manufacturing facility and the contamination of the Gd-free pellets with Gd must be avoided. Therefore, the manufacturing line for the Gd-containing pellets by using powdery $Gd_2O_3$ must be completely separated from the ordinary manufacturing line for the Gd-free pellets and two or more inspection facilities are required, which remarkably increases the manufacturing cost of the nuclear fuel.

SUMMARY OF THE INVENTION

Therefore, an object of the present invention is to provide a fuel rod for a nuclear reactor using a nuclear fuel which can overcome the defects of the conventional Gd-containing homogeneous pellets and double pellets to thereby reduce the manufacturing cost by simplifying the manufacturing facility, to relax the nuclear and thermal restrictions, and to enable the $Gd_2O_3$ concentration to be selected without limitation depending on the desired performance.

According to the present invention, there is provided a fuel rod for a nuclear reactor comprising a plurality of hollow pellets each having a hole along its central axis and made of uranium dioxide or a mixed-oxide of uranium dioxide and plutonium dioxide, a bar made of a combustible reactivity control material, the plurality of hollow pellets being spitted with the bar to form a pellet stack, and a cladding tube in which the pellet stack is inserted and sealed.

In the present invention as described above, the hollow pellets of $UO_2$ or MOX are manufactured by a conventional process in a nuclear fuel manufacturing facility. On the other hand, the bar of a combustible reactivity control material such as $Gd_2O_3$ can be previously manufactured in a non-nuclear fuel manufacturing plant (which is different from the nuclear fuel manufacturing facility) and then combined with the hollow pellets in the nuclear fuel manufacturing facility to form a fuel rod of the present invention. Therefore, it is unnecessary to form two independent lines, i.e. the line for handling $Gd_2O_3$ and the line for handling only the nuclear fuel material such as $UO_2$ or MOX, in the nuclear fuel manufacturing facility, and the manufacturing cost for the nuclear fuel rod can be reduced.

The optimum fuel rod can be designed by varying the diameter of the $Gd_2O_3$ bar or the $Gd_2O_3$ concentration in the bar depending on the performance of the nuclear fuel.

In the Structure of the present invention wherein the $Gd_2O_3$ bar is inserted into the holes of the hollow $UO_2$ or MOX pellets, the excellent performance of the conventional hollow pellet as the nuclear fuel can be kept as it is. Namely, as compared with a solid fuel pellet made of the same material, the hollow pellet makes it possible to keep the fuel temperature low, to control the release of fissionable gas, and to reduce the mechanical interaction between the fuel pellets and the cladding tube, Further in the present invention, the holes of the hollow pellets are not broken even when plastic deformation occurs in the hollow pellets during the irradiation in a nuclear reactor and, therefore, the characteristic features of the hollow pellets can be retained.

BRIEF DESCRIPTION OF THE DRAWINGS

FIGS. 1(A) to 1(E) illustrate the steps of manufacturing the fuel rod of the present invention;

PREFERRED EMBODIMENTS OF THE INVENTION

Figure 2:
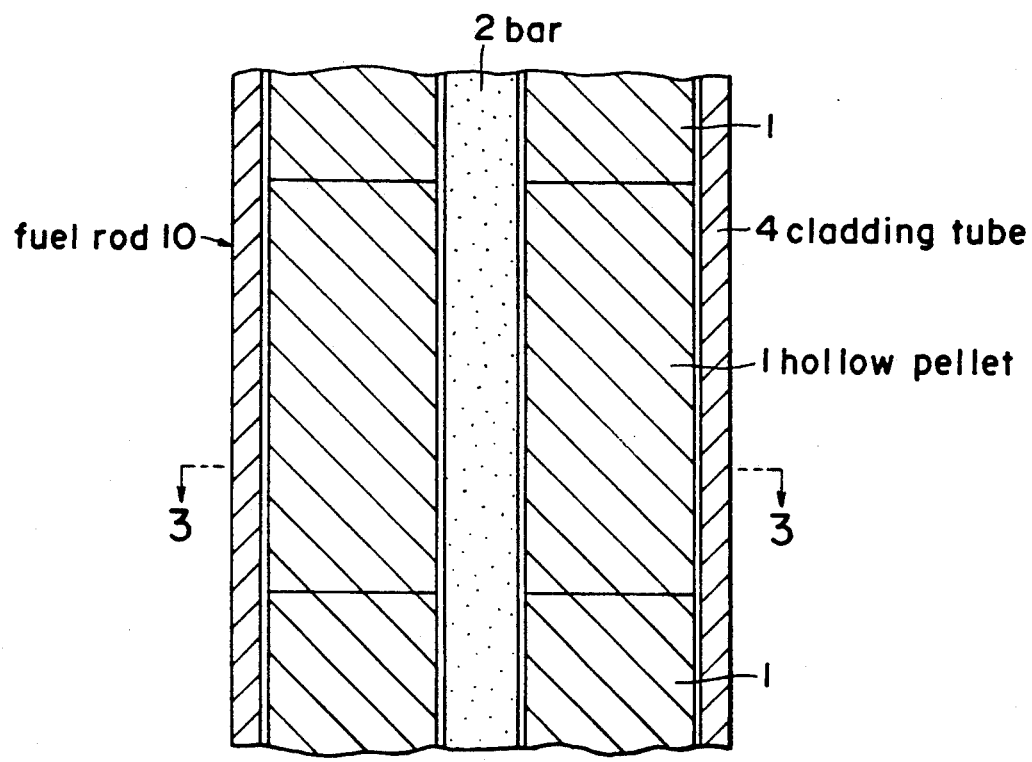
FIG. 2 illustrates a longitudinal cross section of a part of the fuel rod of the present invention.

FIG. 1 shows the assembly process for manufacturing the fuel rod of the present invention. FIG. 1(A) shows hollow $UO_2$ or MOX pellets 1 and a long $Gd_2O_3$ bar 2 in alignment with the holes of the hollow pellets 1. The hollow pellets 1 are manufactured by mixing, molding and sintering the powdery $UO_2$ or MOX in a conventional nuclear fuel manufacturing facility. On the other hand, the $Gd_2O_3$ bar 2 is manufactured by molding powdery $Gd_2O_3$ into the form of a bar by means of extrusion molding and then sintering it in a non-nuclear fuel manufacturing facility which is different from the nuclear fuel manufacturing facility, and then transferred to the nuclear fuel manufacturing facility.

FIG. 1(B) shows the step of inserting the bar 2 into the holes of the hollow pellets 1 successively so as to spit the pellets 1 with the bar 2 to form a pellet stack as shown in FIG. 1(C). The thus formed pellet stack 3 is then inserted into a cladding tube 4 made of a metal such as zircaloy or stainless steel as shown in FIG. 1(D) and then the open ends of the cladding tube are sealed with plugs 5 to form an intended fuel rod 10 as shown in FIG. 1(E).

Figure 3:
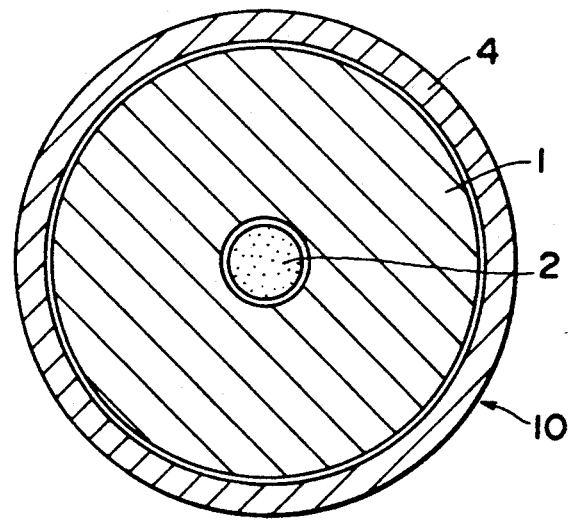
FIG. 3 illustrates a transverse cross section along 3—3 in FIG. 2.

FIGS. 2 and 3 are cross sections showing the structure of the fuel rod 10 wherein the long bar 2 is inserted into the holes of the piled hollow pellets 1 to spit the pellets 1 with the bar 2 and the pellet stack thus formed is inserted into the cladding tube 4.

Figure 4:
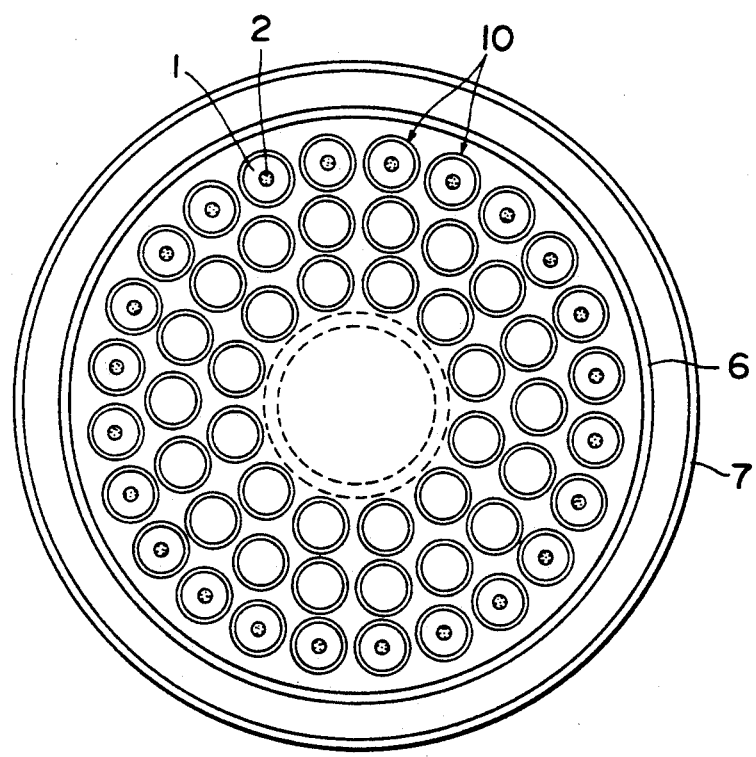
FIG. 4 illustrates a cross section showing an embodiment of a fuel assembly wherein the fuel rods of the present invention are used for constituting the outer layer.

The fuel rod of the present invention will be illustrated below with reference to the use thereof in an Advanced Thermal Reactor (ATR). FIG. 4 shows a fuel assembly comprising 54 fuel rods in total, i.e. 12 rods constituting the inner layer, 18 rods constituting the intermediate layer and 24 rods constituting the outer layer. The fuel rods 10 of the present invention, each comprising the combination of hollow MOX pellets 1 and $Gd_2O_3$ bar 2, constitute the outer layer. The bar has a $Gd_2O_3$ content of 100% and a diameter of 1.0 mm. In FIG. 4, the reference numeral 6 indicates a pressure tube and the reference numeral 7 a calandria tube.

Figure 5:
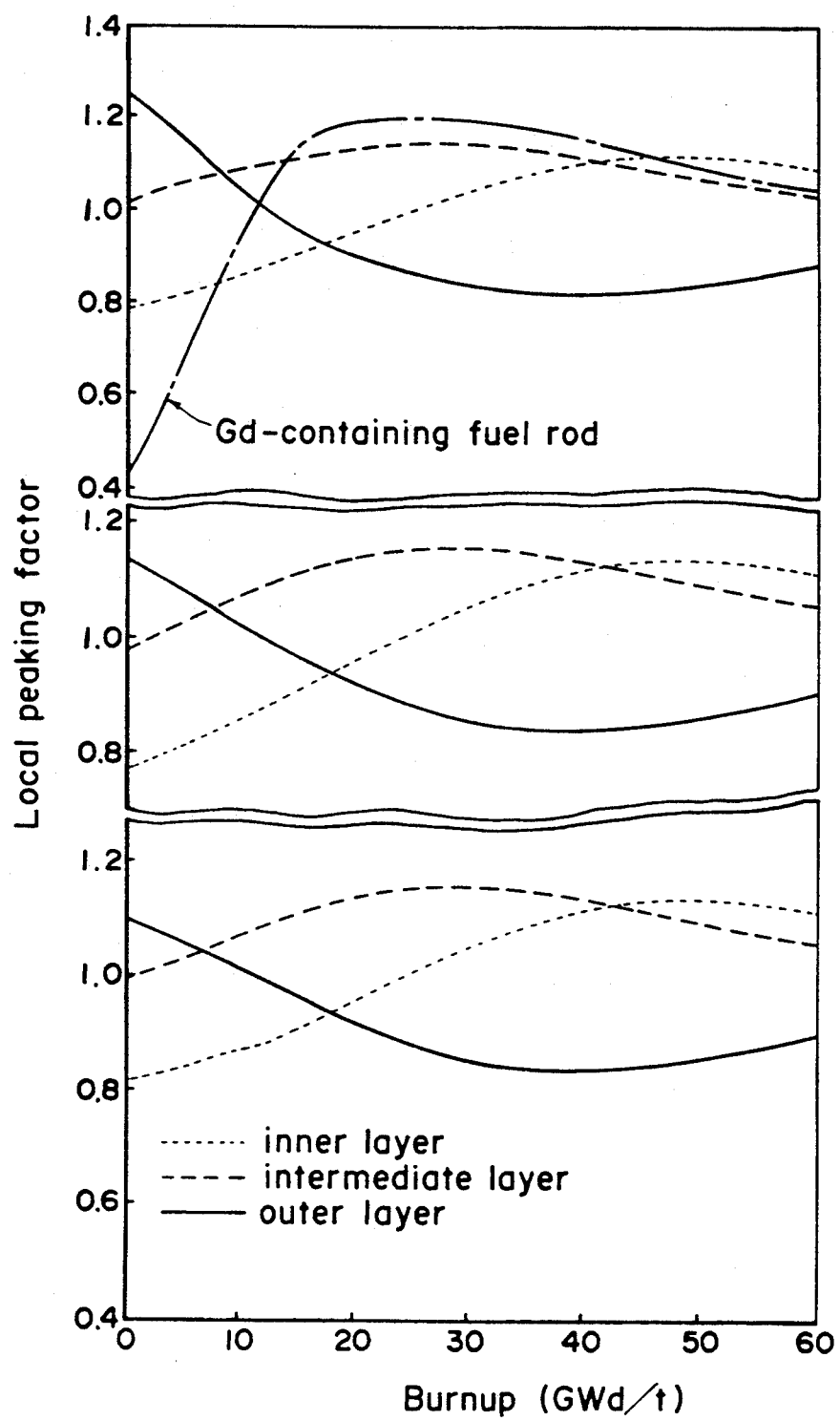
FIG. 5 illustrates a graph showing the relationship between the local peaking factor and the burnup obtained when the fuel assembly shown in FIG. 4 was used (at the bottom of the graph), when the fuel assembly comprising Gd-free fuel rods is used (in the middle thereof) and the fuel assembly comprising conventional fuel rods composed of Gd-containing homogeneous pellets (at the top thereof)

The performance of the fuel assembly was analyzed and evaluated to obtain the results shown in FIG. 5. FIG. 5 is a graph showing the dependence of the local peaking factor of the fuel assembly (the ratio of the maximum linear heat generating rate to the average linear heat generating rate of the fuel rods in the nuclear reactor) on the burnup. The results obtained by using the fuel assembly having the constitution as shown in FIG. 4 are given at the bottom of the graph, and those obtained by using a fuel assembly comprising Gd-free fuel rods are given in the middle of the graph, while those obtained by using a conventional fuel assembly comprising fuel rods composed of Gd-containing homogeneous pellets are given at the top thereof. The Gd-containing homogeneous pellets had a $Gd_2O_3$ content of 3.0% and the outer layer of the fuel assembly had 6 fuel rods comprising the Gd-containing homogeneous pellets.

In the fuel comprising the Gd-containing homogeneous pellets, the powder of the Gd-containing fuel rods is low as shown at the top of FIG. 5 and, therefore, the power of other fuel rods, particularly those disposed in the outer layer must be increased. Accordingly, as for the nuclear properties, the tolerance of the power peaking limit of the fuel rod is reduced and as for the thermal properties, the critical power ratio is reduced. Thus in the fuel containing the Gd-containing homogeneous pellets, only six of the fuel rods constituting the outer layer of the fuel assembly are the Gd-containing fuel rods, since the reactivity control effect becomes excessive when all of the 24 fuel rods constituting the outer layer are the Gd-containing ones.

On the contrary, in the fuel assembly comprising the fuel rods of the present invention shown in FIG. 4, all of the 24 fuel rods in the outer layer can be the fuel rods of the present invention and, therefore, the power of the fuel rods in the outer layer can be evenly lowered. Accordingly, the nuclear and thermal restrictions required in the conventional Gd-containing homogeneous pellets are relaxed and a further rationalization is made possible.

Figure 6:
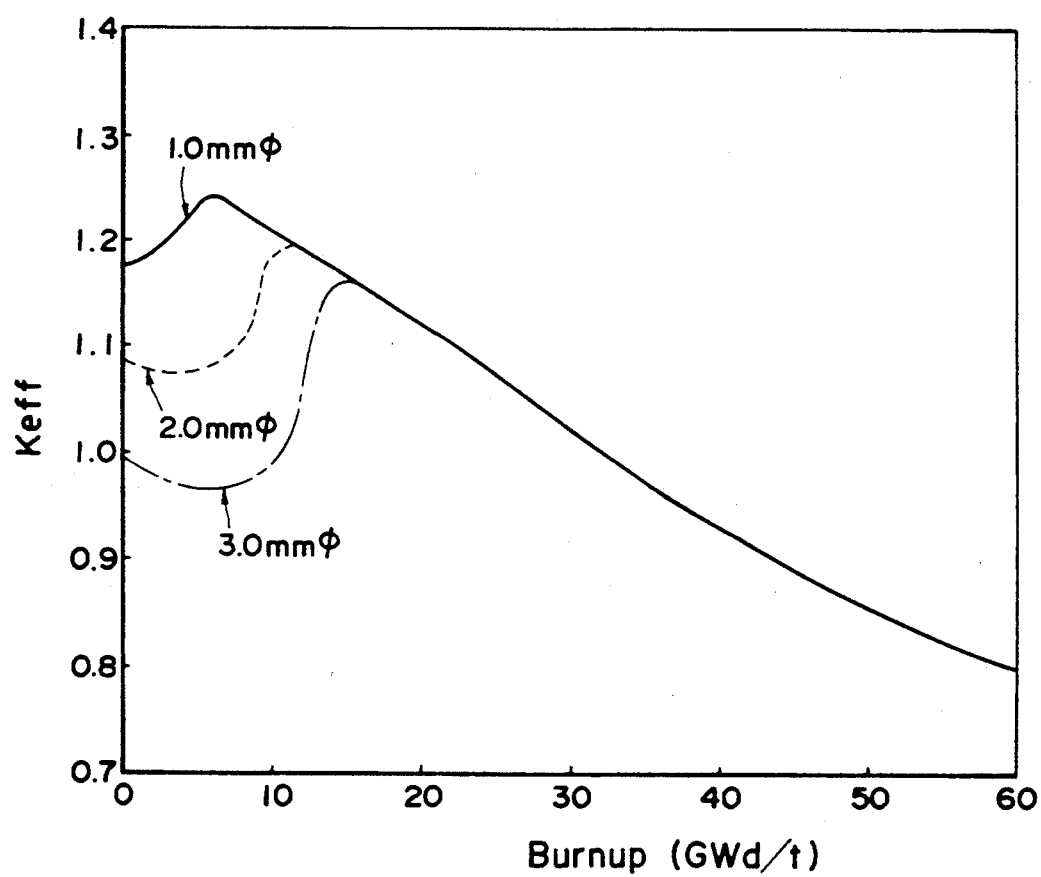
FIG. 6 illustrates a graph showing the relationship between the effective multiplication constant and the burnup obtained by varying the diameter of the $Gd_2O_3$ bar in the fuel rod of the present invention.
Figure 7:
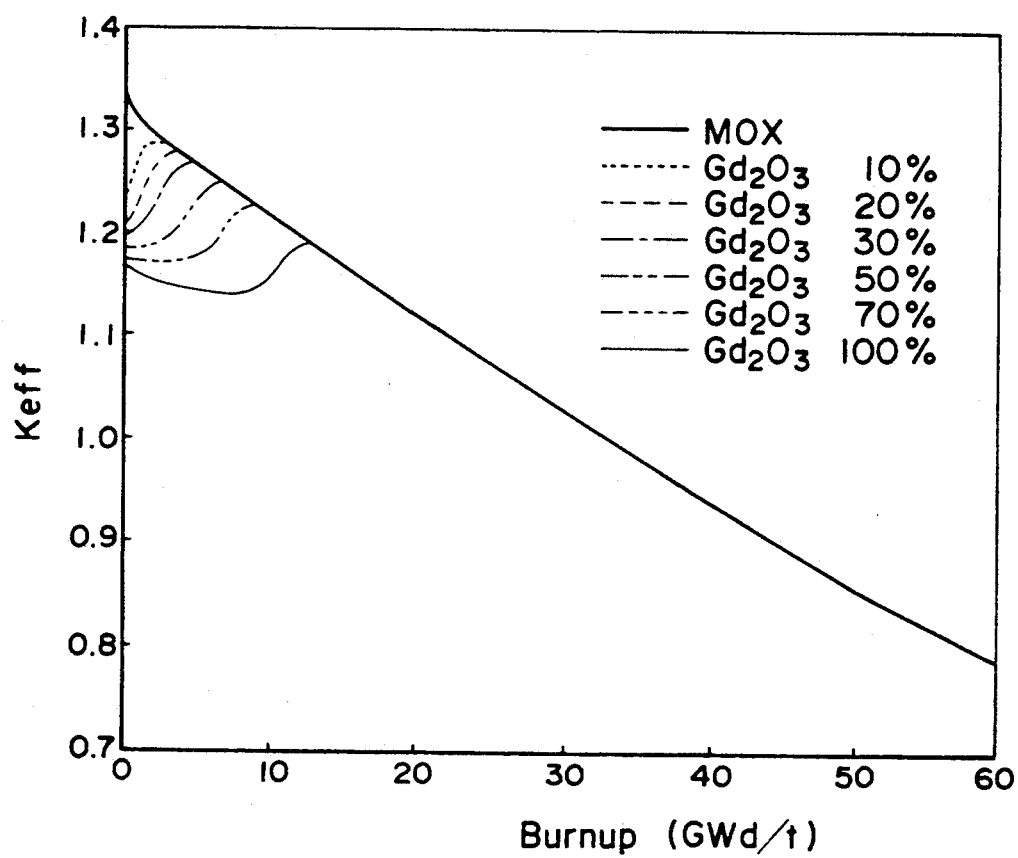
FIG. 7 illustrates a graph showing the relationship between the effective multiplication constant and the burnup obtained by varying the Gd concentration of the $Gd_2O_3$ bar in the fuel rod of the present invention.

FIG. 6 is a graph showing the results of an examination of the dependence of $K_{eff}$ (effective multiplication constant) on the burnup obtained when the diameter of the $Gd_2O_3$ bar having a $Gd_2O_3$ content of 50% was varied to 1.0, 2.0 or 3.0 nun. FIG. 7 is a graph showing the results of an examination of the dependence of $K_{eff}$ on the burnup obtained when the $Gd_2O_3$ content of the $Gd_2O_3$ bar having a diameter of 1.0 mm was varied to 10, 20, 30, 50, 70 or 100%. It will be apparent from these graph that an effect of controlling excess reactivity suitably for the properties of the fuel, such as the fissile concentration or the diameter of the fuel rod, can be obtained by changing the diameter and Gd content of the $Gd_2O_3$ bar.

Although only $Gd_2O_3$ is used as a combustible reactivity control material in the above-described examples, other combustible reactivity control materials such as $Sm_2O_3$, $Eu_2O_3$ and $Dy_2O_3$ may also be used. The concentration of the combustible reactivity control material can be adjusted by diluting it with a ceramic material other than the combustible reactivity control material, such as $ZrO_2$ or $Al_2O_3$.

It will be apparent from the foregoing that the present invention enables a bar comprising a combustible reactivity control material such as $Gd_2O_3$ to be manufactured in an ordinary facility which does not necessitate any radiation control and, therefore, can dispense with two separate lines, i.e. a line for handling $Gd_2O_3$ and a line for handling only $UO_2$ or MOX fuel, in the fuel manufacturing facility. Thus the manufacturing cost of the nuclear fuel rod can be remarkably reduced.

The solubility of $Gd_2O_3$ in $UO_2$ or MOX was limited in a conventional homogeneous pellet comprising a homogeneous solid solution of $Gd_2O_3$ in $UO_2$ or MOX. However, in the present invention, the optimum design for the performance of the nuclear fuel is possible by changing the diameter of the $Gd_2O_3$ bar and/or $Gd_2O_3$ concentration depending on the performance of the nuclear fuel and further, the nuclear and thermal restrictions required of the homogeneous pellet are relaxed.

Further, in the present invention wherein the hollow $UO_2$ or MOX pellets are used, the fuel temperature in the reactor can be kept low, and excellent properties of conventional hollow pellets such as the reduced discharge of the fissionable gas, can be maintained.

What is claimed is:

1. A fuel rod for a nuclear reactor comprising
   a plurality of hollow pellets each having a hole along its central axis and made of uranium dioxide or a mixed-oxide of uranium dioxide and plutonium dioxide,
   a bar made of a sintered oxide of combustible reactivity control material, said plurality of hollow pellets being spitted with said bar to form a pellet stack, and
   a cladding tube in which said pellet stack is inserted and sealed.

2. The fuel rod for a nuclear reactor according to claim 1, wherein the diameter of said bar is adjusted depending on the desired performance of the fuel rod.

3. The fuel rod for a nuclear reactor according to claim 1, wherein the concentration of the combustible reactivity control material in said bar is adjusted depending on the desired performance of the fuel rod.

4. The fuel rod for a nuclear reactor according to claim 3, wherein the adjustment of the concentration of the combustible reactivity control material in said bar is carried out by diluting the combustible reactivity control material with a ceramic material.

5. The fuel rod for a nuclear reactor according to claim 1, wherein said bar is manufactured by molding a powdery gadolinium oxide into the form of a bar and then sintering said bar.

* * * * *